(No Model.) 2 Sheets—Sheet 2.

H. DALE.
FIRE PROOF SHUTTER FOR STAIRWAYS.

No. 350,664. Patented Oct. 12, 1886.

WITNESSES:
F. McArdle
C. Sedgwick

INVENTOR:
H. Dale
BY Munn & Co.
ATTORNEYS.

UNITED STATES PATENT OFFICE.

HENRY DALE, OF NEW YORK, N. Y.

FIRE-PROOF SHUTTER FOR STAIRWAYS.

SPECIFICATION forming part of Letters Patent No. 350,664, dated October 12, 1886.

Application filed April 7, 1886. Serial No. 198,073. (No model.)

*To all whom it may concern:*

Be it known that I, HENRY DALE, of New York, in the county and State of New York, have invented a new and Improved Fire-Proof Shutter for Stairways, of which the following is a full, clear, and exact description.

This invention relates to the construction of an apparatus designed to prevent the spreading of fire from floor to floor; and to the end named the invention consists of a corrugated iron shutter that is housed or boxed beneath the stairs leading to the floor above that in connection with which the shutter is arranged, the said shutter being so constructed and mounted that it can be readily withdrawn from its housing and drawn to a position to cover the well or opening formed for the stairway leading to the floor of the compartment beneath the floor in connection with which the shutter is arranged.

Reference is to be had to the accompanying drawings, forming a part of this specification, in which similar figures of reference indicate corresponding parts in all the figures.

Figure 1:
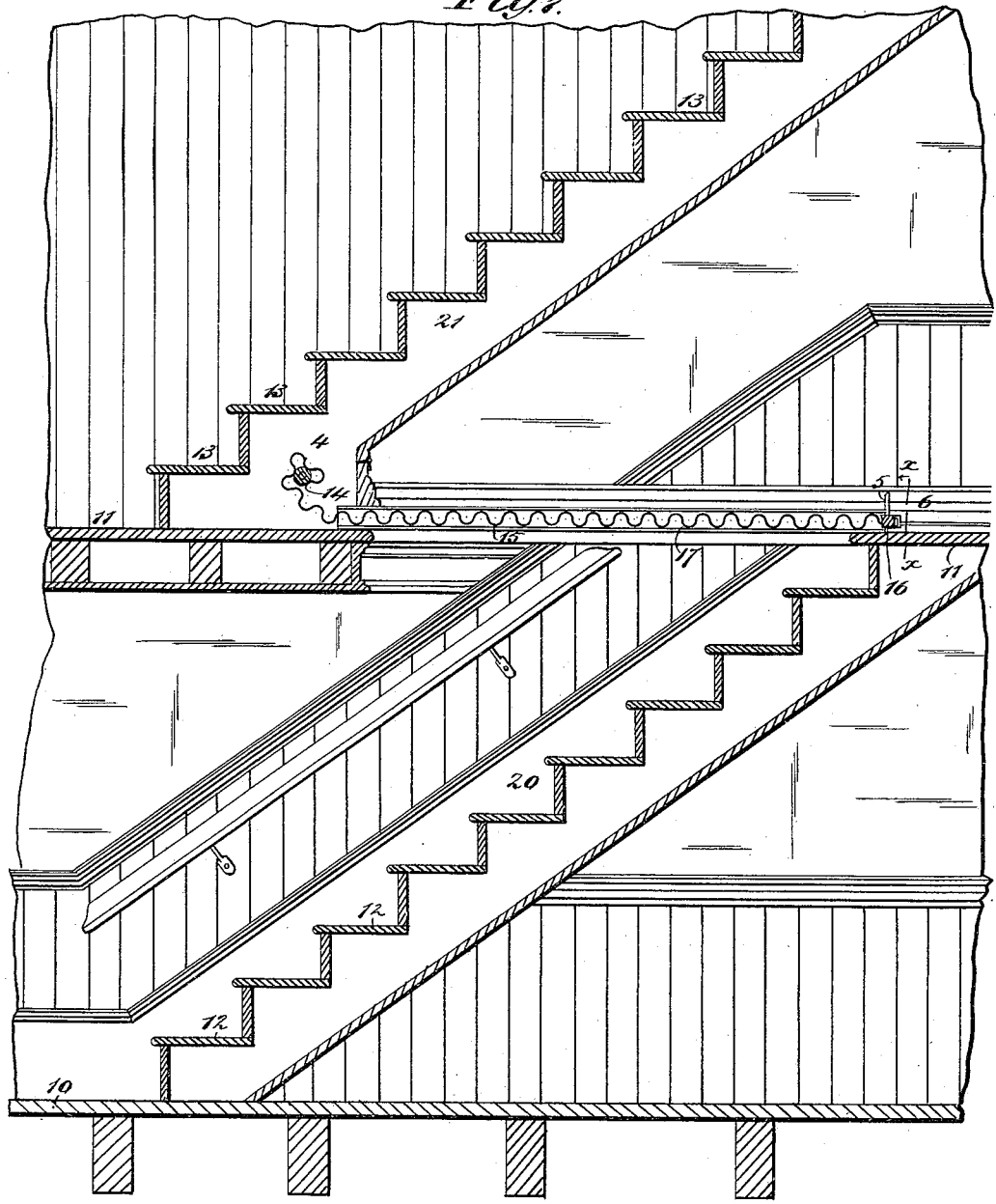
Figure 2:
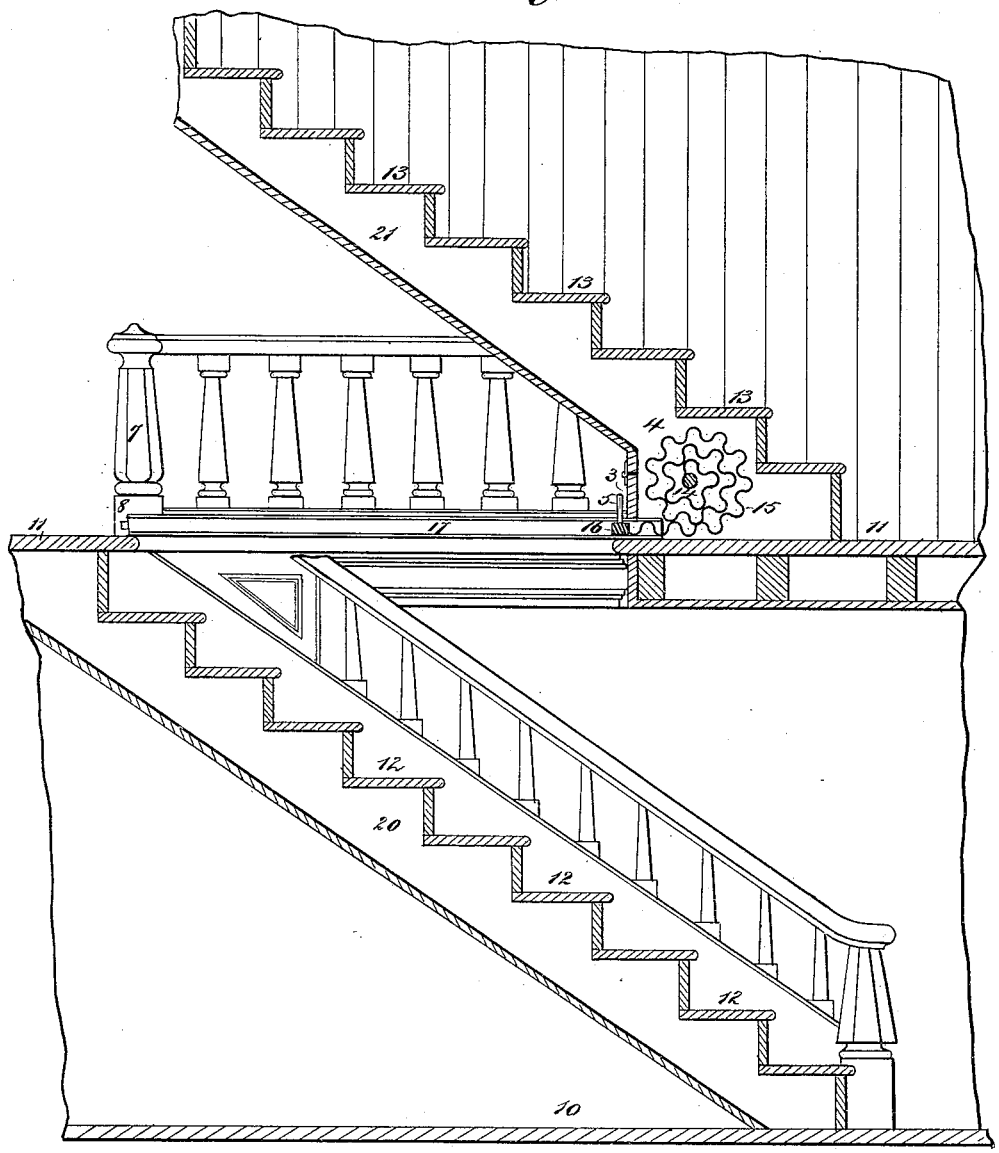
Figure 3:
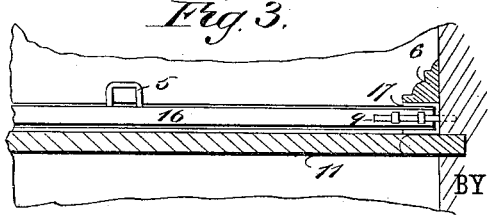

Figure 1 is a central vertical sectional view of two stairways that are arranged in the ordinary manner, the view being taken from a position within the store or hallway. Fig. 2 is a similar view, looking in the opposite direction; and Fig. 3 is a view of a portion of the extending end of the shutter, the view being taken on line $x$ $x$ of Fig. 1.

Although the drawings illustrate my shutter as arranged only in connection with the floor directly above the basement of the store or dwelling in connection with which my invention is applied, it will of course be understood that the shutter could and would be arranged in connection with all of the floors above the basement.

In the drawings, 10 represents the basement-floor, and 11 the main floor, of the building.

12 12 are the treads of the stairs leading from the basement to the first floor, and for the sake of convenience and clearness of description I will designate these stairs, as a whole, by the numeral 20, while the stairs leading from the first to the second floor I designate by the numeral 21, the treads of the stairs 21 being shown at 13 13. Beneath the second tread 13 of the stairs 21 I mount a shaft, 14, the ends of which are supported in proper bearings fixed to the casing of the stairs. One end of a spring corrugated metallic shutter, 15, is secured to the shaft 14, while the other end of said shutter is fixed to a rod or strip, 16, the ends of which ride in ways 17, that are formed just above the floor 11, as clearly shown in the drawings, the width of the shutter being equal to the length of the strip 16, so that the side edges of the shutter will extend within the grooves or ways 17 when such shutter is drawn out to the position shown in Fig. 1. After the shutter has been drawn to the position shown in Fig. 1 it is held in place by bolts 9, that are fixed to each end of the strip 16 and arranged to enter sockets 8, formed in the newel-post 7 and the base-board 6.

The shutter 15 is, as above stated, made of a corrugated spring-strip, the tendency of which is to assume the position shown in Fig. 2, so that when the bolts 9 are released from engagement with the sockets 8 the shutter 15 will be drawn within its housing 4 beneath the treads of the stairs 21; but this inward movement of the shutter is limited by the combined stop and handle 5, that is fixed to about the middle of the upper face of the strip 16, for any continued movement of the shutter 15, after it has been drawn in the position in which it is shown in Fig. 2, will bring the stop or handle 5 against the outer face of the hinged door or shutter 3, which, as clearly shown in the drawings, closes the entrance to the housing 4.

The shutter described can be drawn out at night, and, being drawn out, will effectually close the passage from floor to floor, and will consequently bar the progress of a fire and prevent the passage of smoke or other products of combustion which would be likely to damage or injure the goods or furniture contained within the store or dwelling.

Having thus fully described my invention, what I claim as new, and desire to secure by Letters Patent, is—

1. The combination, with a well-opening in a floor of a building, of a shutter normally housed beneath the stairs and arranged to slide across the well-opening, substantially as described.

2. The combination, with a well-opening in the floor of a building, of a corrugated metallic shutter, one end of which is fixed to a shaft mounted in a housing beneath the stairs, while the other end is fixed to a strip carrying bolts that are arranged to engage with sockets located as described.

3. The combination, with a well-opening in the floor of a building, of a corrugated metallic shutter mounted on a shaft, 14, ways 17, strip 16, to which the extending end of the shutter is secured, bolts 9, and a handle or stop, 5, substantially as described.

HENRY DALE.

Witnesses:
ABR. GRUBER,
RICHD. G. ORMSBY.